F. J. KALTEYER.
GOVERNOR.
APPLICATION FILED AUG. 17, 1920.

1,379,265.

Patented May 24, 1921.

INVENTOR.
Frederick J. Kalteyer
BY
ATTORNEY.

UNITED STATES PATENT OFFICE.

FREDERICK J. KALTEYER, OF PHILADELPHIA, PENNSYLVANIA, ASSIGNOR TO ELECTROSTROP MANUFACTURING COMPANY, A CORPORATION OF PENNSYLVANIA.

GOVERNOR.

1,379,265.        Specification of Letters Patent.        Patented May 24, 1921.

Application filed August 17, 1920. Serial No. 404,232.

*To all whom it may concern:*

Be it known that I, FREDERICK J. KALTEYER, a citizen of the United States, residing at Philadelphia, in the county of Philadelphia and State of Pennsylvania, have invented certain new and useful Improvements in Governors, of which the following is a specification.

My invention relates to governors, and has for its object to provide novel features of construction whereby the construction is simplified, the parts held at all times in proper working relation and efficiency in operation is secured. To the accomplishment of the foregoing and such other objects as may hereinafter appear the invention consists in the features hereinafter particularly described and then sought to be clearly defined by the claims, reference being had to the accompanying drawing forming part hereof, and in which—

Figure 1:
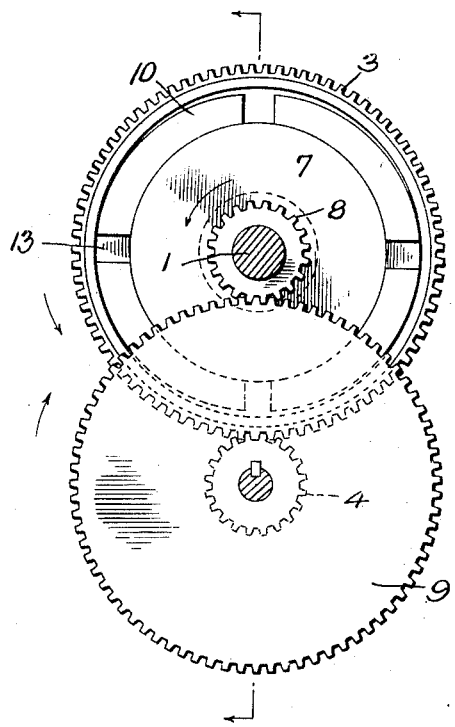
Figure 1 is an end elevation of the associated parts.
Figure 2:
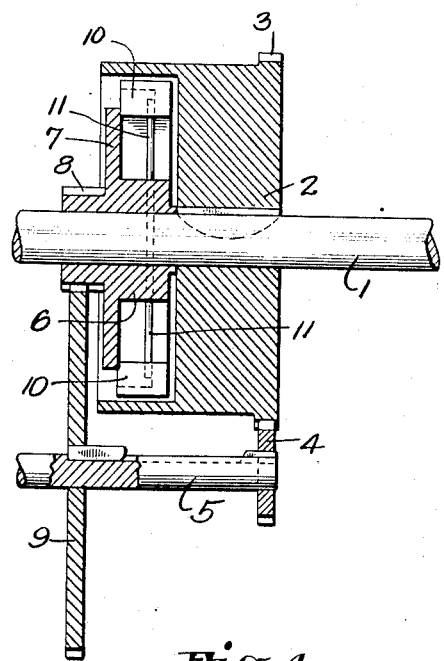
Fig. 2 is a vertical central longitudinal section looking in the direction of the arrows in Fig. 1.
Figure 3:
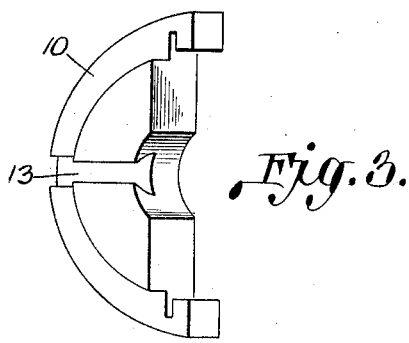
Fig. 3 is a perspective of one of the brake-shoes.
Figure 4:
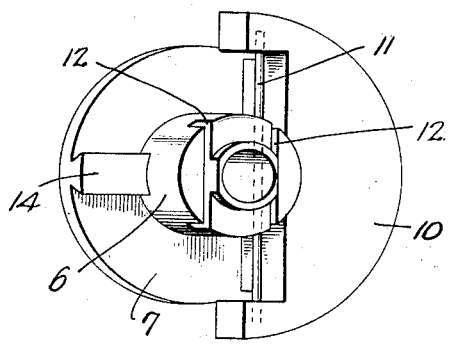
Fig. 4 is a perspective of parts of the governor with one brake-shoe omitted.

In the drawing the numeral 1 designates a drive shaft which derives motion from a suitable source of power and has fixedly mounted thereon a drum 2 formed at one end with a gear 3 which meshes with a pinion 4 keyed to a transmission shaft 5. On the drive shaft is loosely mounted a hub 6 formed with a plate or disk 7 and having at one end a pinion 8 with which meshes a gear 9 keyed to the transmission shaft 5, and on the hub 6 is mounted the brake shoes 10, the same being connected to the hub by springs 11, preferably leaf springs, which lie within slots 12 formed in the hub and have their outer ends seated in the brake-shoes. Each brake-shoe is formed with a dovetailed groove or slot 13 formed radially in the face of the shoe and which receives a dovetailed tongue 14 formed on the inner face of the disk or plate 7. The brake-shoes lie within the drum 2 so that when thrown outwardly by centrifugal force they will impinge against the inner circumferential rim of the drum and serve to check excessive speed that might be transmitted through the transmission shaft. By having the brake-shoes connected with the hub through the dovetail grooves in the shoes and dovetail tongues on the disk the shoes are held in the best working relation to the disk and guided in proper lines by the tongues when thrown outward by centrifugal force and are retracted in proper lines by the springs after discharging their function of brake action to retard excessive speed to the parts to which motion is transmitted through the transmission shaft. The slots in the hub permit of ready assemblage of the brake-shoes on the hub and dovetail tongues of the disk and the placing of the retracting springs in place and also their removal in assembling and disassembling the parts when necessary.

The governor is adapted for application in connection with different character of mechanisms, and may be otherwise connected than as illustrated with drive and transmission shafts or devices.

Having described my invention and set forth its merits what I claim is:

1. A governor comprising a brake-drum, a hub mounted for free rotation within the drum, a disk connected with the hub and provided with dovetail tongues on its face, shoes mounted relatively to the hub and formed with dovetail grooves to receive the tongues of the disk, and springs connecting the shoes and hub.

2. A governor comprising a brake-drum, a hub mounted for free rotation within the drum, a disk connected with the hub, brake shoes mounted relatively to the hub, the disk and shoes being formed one with a dovetail tongue and the other with a correspondingly shaped groove to receive the tongue, and springs connecting the shoes and hub.

3. A governor comprising a brake-drum, a slotted hub mounted for free rotation within the drum, a disk connected with the hub, brake shoes mounted relatively to the hub, the disk and shoes being formed one with a dovetail tongue and the other with a correspondingly shaped groove to receive the tongue, and springs fitting in the slots of the hub and connected with the shoes.

In testimony whereof I affix my signature.

FREDERICK J. KALTEYER.

Witnesses:
    FRANCES A. COMBER,
    CHAS. H. WOLFF.